(12) United States Patent
Tebboune et al.

(10) Patent No.: US 7,974,719 B2
(45) Date of Patent: Jul. 5, 2011

(54) METHOD AND AN APPARATUS FOR AUTOMATIC MANUFACTURE OF AN OBJECT WITH MULTIPLE INTERSECTING COMPONENTS

(76) Inventors: Djamel Tebboune, Jardin (FR); Christian Colombo, Milan (IT)

( * ) Notice: Subject to any disclaimer, the term of this patent is extended or adjusted under 35 U.S.C. 154(b) by 152 days.

(21) Appl. No.: 12/227,802

(22) PCT Filed: Jun. 6, 2007

(86) PCT No.: PCT/EP2007/005045
§ 371 (c)(1),
(2), (4) Date: Nov. 26, 2008

(87) PCT Pub. No.: WO2007/141024
PCT Pub. Date: Dec. 13, 2007

(65) Prior Publication Data
US 2009/0187267 A1 Jul. 23, 2009

(30) Foreign Application Priority Data
Jun. 9, 2006 (IT) .............................. MI2006A1114

(51) Int. Cl.
*G06F 19/00* (2011.01)
*G06F 17/50* (2006.01)

(52) U.S. Cl. .............. 700/96; 700/97; 700/98; 700/182; 703/1

(58) Field of Classification Search ............... 700/95–98, 700/118–119, 163, 181–183; 703/1; 716/1, 716/5, 16, 100, 110, 118
See application file for complete search history.

(56) References Cited

U.S. PATENT DOCUMENTS

| | | | |
|---|---|---|---|
| 4,998,206 A * | 3/1991 | Jones et al. ...................... | 700/96 |
| 5,202,837 A * | 4/1993 | Coe et al. ......................... | 700/98 |
| 5,293,479 A | 3/1994 | Quintero et al. | |
| 5,587,912 A * | 12/1996 | Andersson et al. ............. | 700/98 |
| 5,729,463 A * | 3/1998 | Koenig et al. ................... | 700/98 |
| 6,668,206 B1 * | 12/2003 | Akaike et al. ................... | 700/98 |
| 7,337,030 B2 * | 2/2008 | Thomas et al. ................. | 700/98 |
| 7,369,909 B2 * | 5/2008 | Marshall ......................... | 700/98 |
| 2002/0080194 A1 | 6/2002 | Fujieda | |
| 2002/0107673 A1 | 8/2002 | Haller et al. | |
| 2003/0220707 A1 * | 11/2003 | Budinger et al. ............... | 700/97 |
| 2004/0030426 A1 * | 2/2004 | Popp et al. ...................... | 700/97 |
| 2006/0155405 A1 * | 7/2006 | Zahner, III ..................... | 700/98 |
| 2007/0124008 A1 * | 5/2007 | Imaizumi ........................ | 700/98 |
| 2007/0164113 A1 * | 7/2007 | Culp et al. .............. | 235/462.01 |
| 2008/0006284 A1 * | 1/2008 | Barnes et al. ................... | 131/58 |

FOREIGN PATENT DOCUMENTS

EP 1271412 A 1/2003

* cited by examiner

*Primary Examiner* — Ramesh B Patel
(74) *Attorney, Agent, or Firm* — R. Neil Sudol; Henry D. Coleman; Willian J Sapone

(57) ABSTRACT

Systems and methods for the automatic manufacture of a multiple component object with intersecting components based on a standard design model of the object. The systems and methods according to the invention are capable of automatically extracting from a design model the dimensions of the components and the intersection parameters of the components, and of instructing a manufacturing machine to mark out the position of the components and manufacture the object on the basis of the extracted information. This increases efficiency and compatibility with existing design models and reduces cost.

14 Claims, 2 Drawing Sheets

METHOD AND AN APPARATUS FOR AUTOMATIC MANUFACTURE OF AN OBJECT WITH MULTIPLE INTERSECTING COMPONENTS

BACKGROUND OF THE INVENTION

The present invention relates generally to the automatic manufacture and/or marking-out of an object. More particularly, the present invention relates to systems and methods for automatic manufacture of an object based on automatic transmission of a three-dimensional rendering of the object, such as a rendering from a CAD to an assembly line for manufacture.

Computer-aided design (CAD) programs and systems may be used to design detailed three-dimensional models of physical objects, such as structural or mechanical parts of a structure or device. Computer-aided design generally includes the display of a three-dimensional scale model of a structure or device, and this display may be visually produced on a computer display or printed as a schematic diagram. Generally, a computer-aided design model includes design specifications related to the structure or device, which include for example, among others, welding characteristics, names of parts and components, dimensional references for squaring, and so forth.

In order to complete the manufacturing process of a structure or device based on a computer-aided design model, a human operator typically must program manually the manufacturing machines associated with an assembly line based on the computer-aided design display. Production is then enabled once the appropriate information has been communicated to the assembly line. Human intervention is generally necessary to review the computer-aided design information and to provide the necessary information to the automated assembly line apparatus so that the structure or device may be manufactured.

Because the computer-aided design specifications indicated in a computer-aided design display must be passed manually by a human operator from the computer-aided design display to the automated assembly line equipment for the manufacture of a device or structure, a problem arises when the specialized human operator, capable of inputting data into the manufacturing machine, is unavailable. From what has been described above, it is evident that there is a direct need to improve the way in which the design parameters for all the components of an object, for example positions, welding codes, references for squaring and so forth, are provided to a manufacturing machine, while maintaining compatibility with computer aided-design programs. To increase efficiency, design parameters related to intersections and points of contact or connection between components that come into contact with other components are included as design parameters. Further, it is desirable to eliminate the possibility of operator error when providing instructions to automated assembly line equipment. This robust solution improves efficiency and accuracy and lowers cost, since manual marking-out operations can be performed automatically.

U.S. Pat. No. 5,293,479 discloses an expert system that is capable of handling preset pieces in order to obtain objects made deriving from a number of possible combinations of preset pieces.

OBJECTS OF THE INVENTION

Thus, the aim of the present invention is to overcome these and other problems by providing systems and methods related to automated manufacture of an object with multiple intersecting components. To increase efficiency and reduce cost, the systems and methods of the present invention may be based on information included as part of existing computer-aided designs.

SUMMARY OF THE INVENTION

This aim and other objects are achieved by a method for automatic manufacture of an object with multiple intersecting components, which includes: receiving, at a programmable logic controller, a design model of the object; extracting from the design model or design a plurality of components dimensions defining a plurality of components of the object; identifying a plurality of intersection and/or manufacturing parameters that define a plurality of intersections of the components; extracting from the design model the intersection and/or manufacturing parameters; transmitting the parameters and the dimensions of components from the programmable logic controller to at least one manufacturing machine; and manufacturing, by means of the at least one manufacturing machine, the components based at least in part on the transmitted component dimensions and the transmitted parameters, together with the positions, welding codes, reference points for squaring and others.

The above mentioned aim and other objects are also achieved by an apparatus for automatic manufacture of an object with multiple intersecting components, which includes: a receiver associated with a programmable logic controller for receiving a design model of an object; a processor associated with the programmable logic controller which extracts from the design model a plurality of component dimensions which define a plurality of components of the object; the processor identifying a plurality of intersection and/or manufacturing parameters which define a plurality of intersections of the components; the processor extracting from the design model the intersection parameters and/or manufacturing parameters; a transmitter associated with the processor for transmitting the intersection and/or manufacturing parameters and the component dimensions from the programmable logic controller to at least one manufacturing machine; the at least one manufacturing machine manufacturing the components based at least in part on the transmitted dimensions of the components and on the transmitted parameters.

Similarly, the above mentioned aim and objects may be achieved by an article of manufacture including a program storage medium having computer-readable program code incorporated therein for the automatic manufacture of an object with multiple intersecting components, the computer-readable program code in the main memory including: computer-readable code for receiving, at a programmable logic controller, a design model of the object; computer-readable code for extracting from the design model a plurality of component dimensions defining a plurality of components of the object; computer-readable code for identifying a plurality of intersection and/or manufacturing parameters which define a plurality of intersections of the components; computer-readable code for extracting from the design model the intersection and/or manufacturing parameters; computer-readable code for transmitting the intersection and/or manufacturing parameters and the dimensions of components from the programmable logic controller to at least one manufacturing machine; and computer-readable code for manufacturing and/or marking out and/or welding, by virtue of the at least one manufacturing machine, the components based at least in part on the transmitted component dimensions and the transmitted parameters, including intersection and/or manufacturing parameters, reference points, welding codes, and so forth.

In certain embodiments, the invention may also include assembling the object from the manufactured components. Further, a storage unit for storing the design parameters related to the components or the intersections between the components, and a visual display of at least one point of intersection of components may also be included.

The aim and objects of the present invention are achieved by the methods and systems according to independent claim 1 and any other independent claim of the invention. Further details are found in the remaining dependent claims. Other aspects and advantages of the present invention will become apparent from the following detailed description, taken in conjunction with the accompanying drawings, which illustrate the principles of the invention by way of example only.

BRIEF DESCRIPTION OF THE DRAWINGS

Further characteristics and advantages will become better apparent from the description of preferred but not exclusive embodiments of the invention, illustrated by way of non-limiting example in the accompanying drawings, wherein.

DETAILED DESCRIPTION OF PREFERRED EMBODIMENTS

With reference to the cited figures, the invention may be incorporated in systems and methods for the automatic manufacture of an object with multiple intersecting components. These systems and methods allow automated transfer of design parameters from a computer-aided design program to a programmable logic controller associated with assembly-line manufacturing equipment. The embodiments of the invention allow assembly of a complete object.

Figure 1:
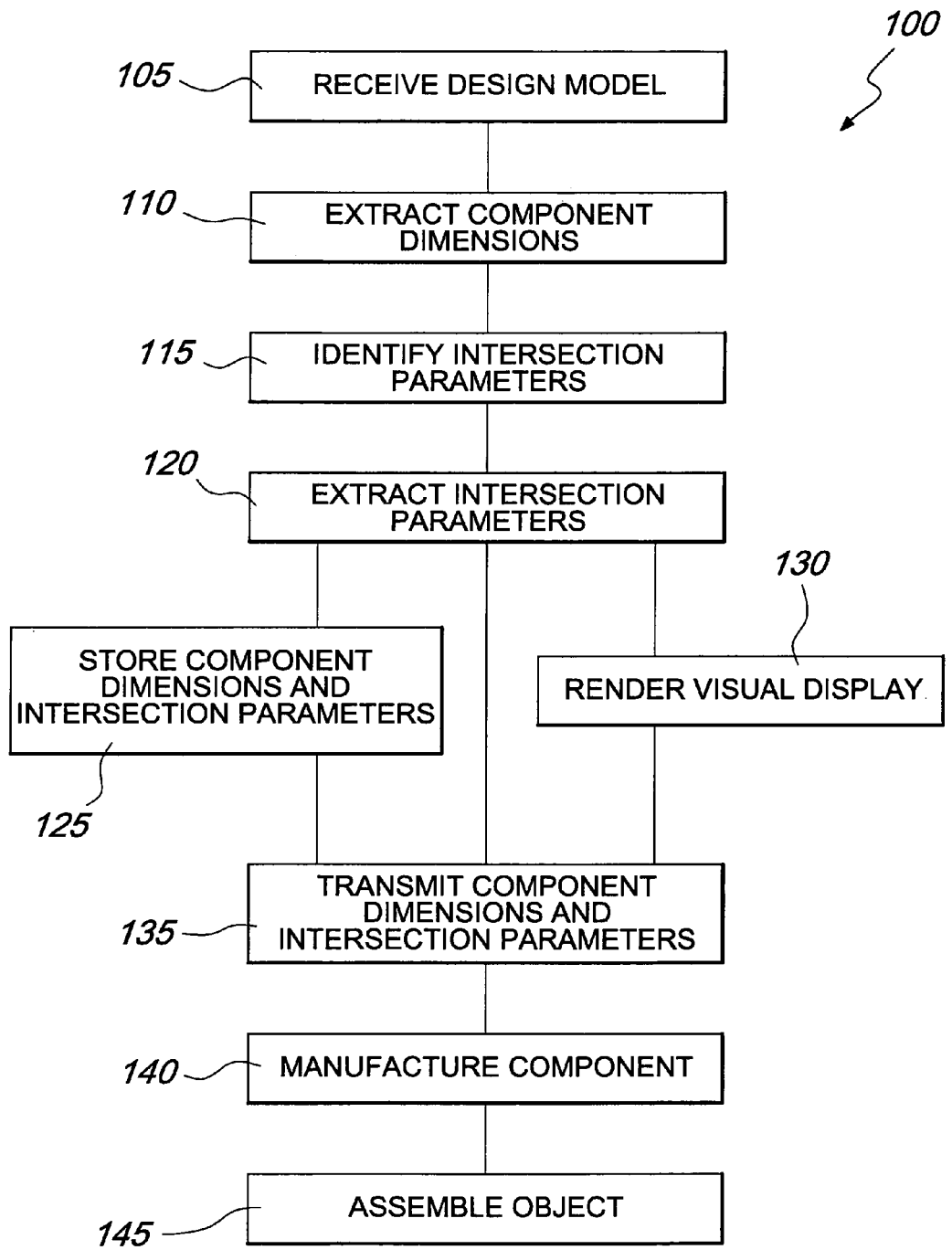
FIG. 1 is a flow chart depicting a method for automatic manufacture of an object with multiple intersecting components in accordance with an embodiment of the invention.

Briefly, FIG. 1 is a flow chart of a method 100 for the automatic manufacture of an object with multiple intersecting components according to an embodiment of the invention. The method 100 includes a first step of receiving a three-dimensional design model of an object (step 105). Generally, the three-dimensional design model of the object is received electronically by any medium and can be received via wired or wireless communication. The receiving step (step 105) may also be manual, for example with the assistance of a technician.

The method 100 can include a step which consists in extracting from a design model a plurality of component dimensions defining a plurality of components of the object (step 110). The step of extraction (step 110) can occur by using a logic system associated with a programmable logic controller. Extracting dimensions of object components of the design model or design (step 110) generally includes identifying the individual components that are connected together or otherwise associated with each other to form the object. For example, if the object is a particular product, such as an architectural structure representing a shed, each pillar may be considered as a component of the shed. It should be noted that the shed is used here merely by way of example. Likewise, the beams of the shed can reasonably be considered as components of the building, as well. The design model, for example a computer-aided design (CAD) model, typically includes component dimensions. For example, each pillar of the shed can be seen as a typical "H" section steel pillar, 6.5 metres high, 1 metre deep and 1 metre wide. In a typical embodiment, the method 100 is able to identify and extract these component dimensions (step 110) from the design model.

After extracting a plurality of components, the method 100 proceeds to identify a plurality of intersection and/or manufacturing parameters, which define a plurality of intersections of the components of the object (step 115). Intersection and/or manufacturing parameters are generally associated with an intersection or association of any two or more components that make up an object. To continue with the previous shed example, the H-shaped components that form the pillars of the shed and the beams intersect by means of the installation of cross arms, fixed by means of bolts to said pillars on which the beams are lain on. The point at which the pillar intersects the beam, that is to say the point where the cross arm should be installed, is an intersection point. The intersection and/or manufacturing parameters define this intersection point and the manufacturing to be performed.

The parameters associated, for instance, with the cross arms (distance from the floor, bolts fixing point, the point of support of the beam, et cetera) are intersection and/or manufacturing parameters.

After identifying the intersection and/or manufacturing parameters (step 115), the method 100 proceeds to extract from the design model the intersection and/or manufacturing parameters. Typically, this includes copying or recording the intersection parameters and the original intersection parameters, and all the other data, which are present in the design model and are not lost. At this point, the method 100 has extracted the component dimensions (step 110) as well as intersection and/or manufacturing parameters (step 120). In some embodiments, the method 100 may store the component dimensions, the intersection and/or manufacturing parameters, or both (step 125). The storage step (step 125) may be temporary or permanent, and may occur at a local or remote location. Further, the method 100 may render a visual display of a component intersection, which includes a display of intersection and/or manufacturing parameters (step 130). In various embodiments, this display may include all or part of the object and any number of intersections and corresponding intersection and/or manufacturing parameters.

The method 100 proceeds to transmit the intersection and/or manufacturing parameters and the component dimensions from the programmable logic controller to at least one manufacturing machine (step 135). This transmission (step 135) may generally occur via any medium, and may be wired or wireless. This transmission can occur automatically, i.e., without human intervention, after the receipt of the intersection and/or manufacturing parameters and the component dimensions receiving step (step 105). Transmission of data from a manufacturing machine (step 135) is followed by the step of manufacturing the components (step 140) based at least in part on the transferred component dimensions and on the transferred intersection and/or manufacturing parameters. In this way, the components are then assembled to specification. The method 100 may then also proceed with the step of assembling the object (step 145). This typically requires configuring the components as indicated in the design model. Because the components now have the proper component dimensions, and because the intersection parameters allow the desired association between two or more components at an intersection point, the manufacturing process may end with complete object assembly according to the specifications of the design model.

Figure 2:
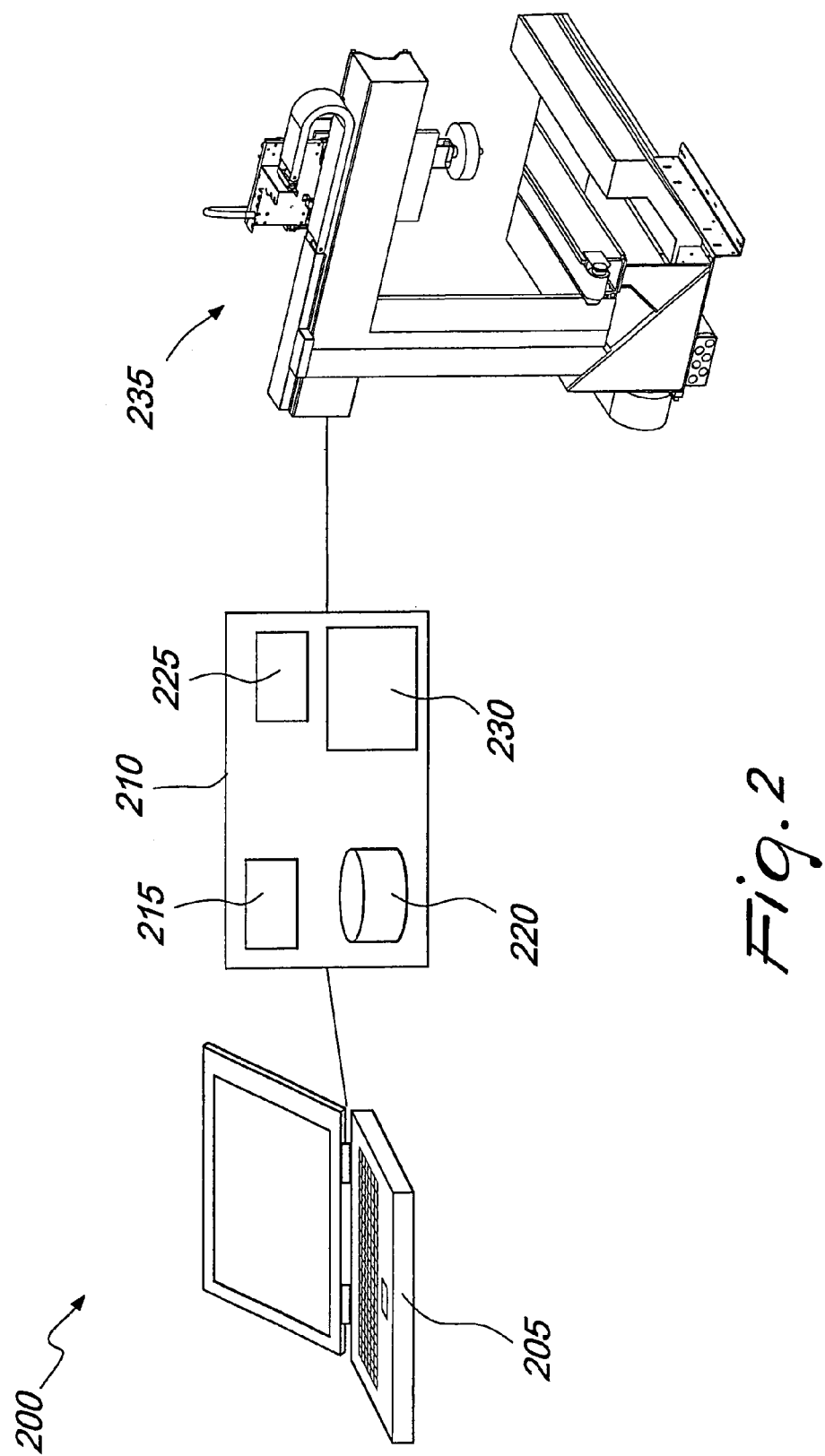
FIG. 2 is a block diagram depicting a system for automatic manufacture of an object with multiple intersecting components in accordance with an embodiment of the invention.

In brief overview, FIG. 2 is a block diagram depicting a system 200 for the automatic manufacture of an object with multiple intersecting components in accordance with another aspect of the invention. The system 200 typically includes a computer 205. The computer 205 may be any general-purpose or industrial computer that includes a computer-aided design (CAD) program or other similar program for rendering a technical visual display of an object. Typically, a design model of an object is created and stored on the computer 205. An object typically includes a plurality of individual components which are mutually connected or otherwise associated in order to form the complete object.

If the object to be manufactured is an architectural structure, representing a shed, a program on the computer 205, such as a computer-aided design program, creates or stores a functional diagram of the structure, such as a CAD drawing or specification sheet. This functional diagram or drawing may be referred to as a design model of the object, and a design model typically includes additional specifications, such as the dimensions of the individual components that make up the object and the way in which the individual components are mutually associated where they intersect. As will be demonstrated below, the automated assembly of the object is based on a design model and the entire manufacturing process, from completion of the design model to manufacture of the object, can be completed without direct human intervention.

Another feature of the system 200 is at least one programmable logic controller 210. The programmable logic controller 210 is implemented in order to control and monitor the manufacture of an object. Any device capable of processing a design model as described herein may be considered as a programmable logic controller 210. In various embodiments, one or more logic devices or processors may be used.

The programmable logic controller 210 may include a receiver 215. The receiver 215 is associated with the programmable logic controller 210 and receives as input at least one design model of an object. The receiver 215 may be an integral component of the programmable logic controller 210. Alternatively, the receiver 215 may be a separate element associated with the programmable logic controller 210 and the receiver 215 may be located remotely from the programmable logic controller 210.

The programmable logic controller 210 typically also includes a storage unit 220, which is capable of storing electronic data. For example, the storage unit 220 may include standard RAM or ROM memory devices. The storage unit 220 may also be an integral or separate component of the programmable logic controller 210. Further, the programmable logic controller 210 includes a transmitter 225. The transmitter 225 transmits or sends data from the programmable logic controller 210 to an outside destination, such as the computer 205 or another device related to the automatic manufacture of a multiple-component object, such as a manufacturing machine. In some embodiments, the transmitter 225 may be associated with the programmable logic controller 210 but be located remotely. The transmitter 225 may be integrated in the programmable logic controller 210 or can be a separate component.

The monitor 230, which may be included as part of the programmable logic controller 210 or more broadly of the method 200, generally accepts data, such as video signals, from a device such as a computer or processor, and displays the data on an electronic display device, such as a computer screen. The monitor 230 can display any of the data received by the receiver 215 or transmitted by the transmitter 225.

In a preferred embodiment, the method 200 also includes at least one manufacturing machine 235. The manufacturing machine 235 is a machine, such as a machine which forms a part of an assembly line, which assembles, marks out and/or welds, builds or creates all or part of the object to be manufactured or a component of the object. Generally, a manufacturing machine 235 is in communication with the programmable logic controller 210 and the manufacturing machine 235 may itself include a logic system, such as a processor, capable of communicating with the programmable logic controller 210, such as for example to receive and perform instructions related to the assembly of an object or component. The manufacturing machine 235 may for example be a machine tool, which is generally an electrically-powered mechanical device for manufacturing objects or components of objects by selective removal or shaping of material. Generally, the manufacturing machine 235 can include other cutting tools, shaping machines, lathes, et cetera.

In a general embodiment, the computer 205 contains a design model, such as a computer-aided design (CAD) model. The design model is generally a detailed structural diagram which includes all of the specifications and tolerances needed to allow assembly of the object within an acceptable tolerance range. The object may include a plurality of components which, when correctly combined, form the object. The components are generally in contact with other components and the components are in contact with each other at the intersection points in a specific manner. The design model typically includes specification and tolerance levels related to the points of intersection between components.

This design model is then communicated to the programmable logic controller 210. This communication may be automated and electronic, and may occur over a network, such as a local area network (LAN), a wide area network (WAN), or the Internet. This communication may also occur via a computer disk transferred manually from the computer 205 to the programmable logic controller 210.

Once the receiver 215 has received the design model, it can be stored in the storage unit 220 or displayed by the monitor 230. The monitor 230 may also display only a portion of the design model. In various embodiments, the design model may be reformatted in order to be compatible with the programmable logic controller 210 or manufacturing machine 235.

The design model is then automatically passed from the programmable logic controller 210, for example via the transmitter 225, to one or more manufacturing machines 235 for production. In some embodiments, this transmission may occur automatically or without human intervention. Generally, the design model is transferred automatically to the manufacturing machine 235. This may occur via wired or wireless transmission. However, this may also include the physical transfer of computer-readable code, for example by means of a computer disk.

The manufacturing machine 235 receives a design model from the programmable logic controller 210. This generally includes the specifications, such as the design parameters and tolerances necessary for the manufacturing machine 235, to construct all or part of the object or a component of the object. Typically, all specifications associated with points of intersection between components, such as a male/female joint between two components, are included as part of the design model in order to allow complete manufacture and/or assembly of the object or of its components. The manufacturing machine 235 then proceeds to assemble the object or its components on the basis of the specifications included within a design model which has been transmitted from the computer 205 to the programmable logic controller 210 to the manufacturing machine 235. This assembly can occur online in a high-volume assembly line suitable for mass-production of an object. As an alternative, assembly can occur for individual objects or low-volume object samples.

Several manufacturing machines 235 may each receive all or part of the design model from the programmable logic controller 210, and each manufacturing machine may be used to create all or a portion of a component, such that when all the components are assembled together the object has been created. In some situations, the components themselves may be complete, while assembly of the components to form the object may be deferred to facilitate shipping, packaging, storage, et cetera.

It should be noted that in FIGS. 1 and 2 the components are enumerated as individual elements. In practical embodiments of the invention, however, they might be inseparable components of other electronic devices, such as a computer. Therefore, the actions described above may be implemented in software which may be incorporated in an article of manufacture which includes a program storage medium. The program storage medium includes a series of data incorporated in one or more of a carrier wave, a disk (of the magnetic or optical type, for example a CD or DVD, or both), a nonvolatile memory, a tape, a system memory, and a computer hard drive.

From what has been stated above, it will be appreciated that the systems and methods provided by the invention provide a simple and effective way for automatic manufacture of a multiple-component object based on a standard design model of the object. The systems and methods according to the embodiments of the invention are capable of extracting automatically from a design model the dimensions of the components and the intersection and/or machining parameters of the components and of instructing a manufacturing machine to manufacture an object based on this information. This increases the efficiency and compatibility with existing design models and reduces costs.

Any references to front and back, left and right, top and bottom, and upper and lower are intended for convenience of description, not to limit the present invention or its components to any one positional or spatial orientation.

This application claims the priority of Italian Patent Application No. MI2006A001114, filed on Jun. 9, 2006, the subject matter of which is incorporated herein by reference.

What is claimed is:

1. A method for automatic manufacture of an object, the method comprising the steps of:
   creating, at a computing device, a design model of an object having multiple individual components, at least two of the individual components defining an intersection at which the two components are in contact with one another;
   receiving, at a programmable logic controller, the design model of the object;
   storing, at a database unit, the design model received at the programmable logic controller;
   extracting from the design model a plurality of component dimensions defining a plurality of components of the object;
   identifying a plurality of intersection and manufacturing parameters which define in part the intersection of the two components;
   extracting from the design model the intersection and manufacturing parameters;
   transmitting the intersection and manufacturing parameters and the component dimensions from the programmable logic controller to at least one manufacturing machine; and
   manufacturing, by means of the at least one manufacturing machine, the components based at least partly on the transmitted component dimensions and the transmitted intersection and manufacturing parameters.

2. The method according to claim 1, further comprising storing of the component dimensions and of the intersection and manufacturing parameters.

3. The method according to claim 1, further comprising the rendering of a visual display of at least one intersection of the components, wherein the visual display includes at least one intersection parameter.

4. The method according to claim 1, further comprising the assembly of the object from the manufactured components.

5. The method according to claim 1, wherein the design model comprises a three-dimensional visual display design model.

6. The method according to claim 1, wherein receiving the design model of the object comprises receiving a computer-aided design model of the object.

7. An apparatus for automatic manufacture of an object, comprising:
   a computing device adapted to create a design model of an object having multiple individual components, at least two of the individual components defining an intersection at which the two components are in contact with one another;
   at least one programmable logic controller in communication with the computing device and with at least one manufacturing machine;
   a receiver associated with the programmable logic controller for receiving the design model of the object;
   a database unit adapted to store the design model received at the receiver;
   a processor which is associated with the programmable logic controller and extracts from the design model a plurality of dimensions of components which define a plurality of components of the object;
   wherein the processor identifies a plurality of intersection parameters which define the intersection of the two components;
   wherein the processor extracts from the design model the intersection parameters;
   a transmitter associated with the processor for transmitting the intersection and machining parameters and the component dimensions from the programmable logic controller to the at least one manufacturing machine; and
   wherein the at least one manufacturing machine manufactures the components based at least in part on the transmitted component dimensions and on the transmitted intersection and manufacturing parameters.

8. The apparatus according to claim 7, further comprising a data storage unit which is associated with the programmable logic controller for storing the component dimensions and the intersection and manufacturing parameters.

9. The apparatus according to claim 7, further comprising a monitor for rendering a visual display of at least one intersection of the components, wherein the visual display includes at least one intersection parameter.

10. The apparatus according to claim 7, wherein the object is assembled from the manufactured components.

11. The apparatus according to claim 7, wherein the design model comprises a three-dimensional design model.

12. The apparatus according to claim 7, wherein the design model comprises a three-dimensional computer-aided design model.

13. The apparatus according to claim 7, wherein the transmitter passes the design model via a wireless connection.

14. An article of manufacture, comprising a program storage medium which has computer-readable program code incorporated therein for the automatic manufacture of an object, wherein the computer-readable program code in the article of manufacture includes:

computer-readable code for receiving, at a programmable logic controller, a design model of the object, wherein the object has multiple individual components, at least two of the individual components defining an intersection at which the two components are in contact with one another;

computer-readable code for extracting from the design model a plurality of component dimensions which define a plurality of components of the object;

computer-readable code for identifying a plurality of intersection parameters which define the intersection of the two components;

computer-readable code for extracting from the design model the intersection and manufacturing parameters;

computer-readable code for transmitting the intersection and manufacturing parameters and the component dimensions from the programmable logic controller to at least one manufacturing machine; and computer-readable code for manufacturing, by means of the at least one manufacturing machine, the components based at least in part on the transmitted component dimensions and on the transmitted parameters.

\* \* \* \* \*